Aug. 14, 1928. 1,680,452
J. M. COAHRAN
METHOD AND MEANS FOR PREVENTING LOSSES IN CLOSED CIRCUIT TREATING APPARATUS
Filed May 26, 1925
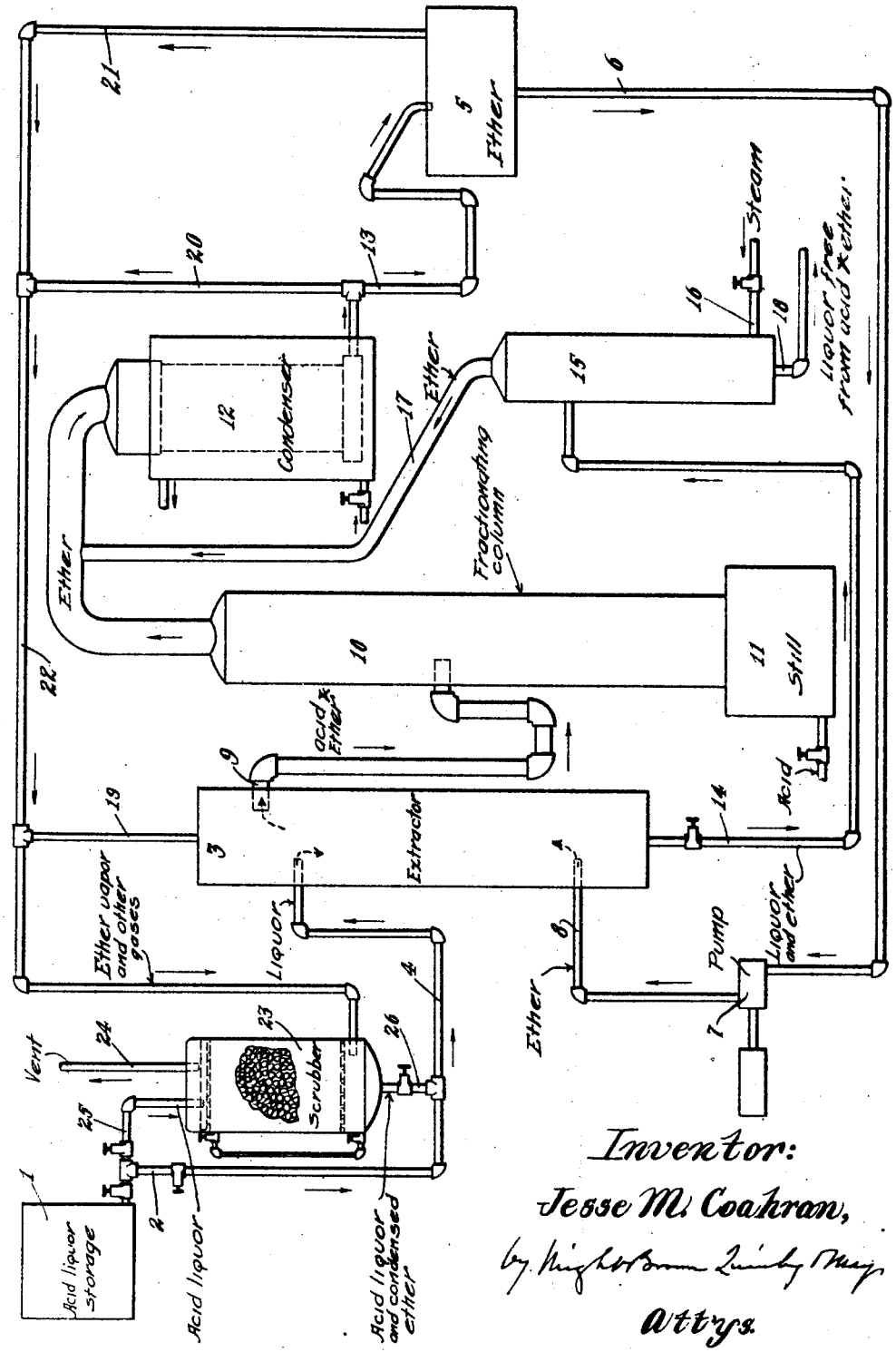
Inventor:
Jesse M. Coahran,
by [signature]
Attys.

Patented Aug. 14, 1928.

1,680,452

UNITED STATES PATENT OFFICE.

JESSE M. COAHRAN, OF COLEGROVE, PENNSYLVANIA, ASSIGNOR TO OLEAN SALES CORPORATION, OF OLEAN, NEW YORK, A CORPORATION OF DELAWARE.

METHOD AND MEANS FOR PREVENTING LOSSES IN CLOSED-CIRCUIT TREATING APPARATUS.

Application filed May 26, 1925. Serial No. 33,032.

In industrial processes it is sometimes desired to treat material with a fluid, as for extracting certain constituents or substances therefrom, then to separate said constituents from the fluid and return the fluid to contact with other untreated material. The same fluid is thus used over and over in a closed circuit or cyclic treating system.

The object of the present invention is to prevent leakage losses of this fluid. Not only is it desirable to prevent such leakage because of the expense of replacing the amount of fluid so lost, but in many instances the fluid used is of a volatile and of a dangerous nature when present in the atmosphere.

According to this invention, therefore, provision is made for maintaining that portion of the apparatus in which the fluid circulates at substantially atmospheric pressure so that the tendency for loss of fluid through leakage from the joints therein is reduced, this being accomplished by providing a vent therefrom to the atmosphere. As, however, such a vent if used alone would permit the free escape of fluid or vapors, means is interposed adjacent to the vent outlet for subjecting any fluid or vapors passing toward this outlet to contact with some of the raw material which is to be treated by the fluid. The treating fluid and vapors passing to the vent are thus absorbed by this material, permitting only inert fluids which may have entered the apparatus accidentally, as with the raw material to be treated, to escape. This raw material with its absorbed fluid is then passed with the other raw material to be treated into that portion of the apparatus where the main body of the fluid is brought into contact therewith. Fluids which would otherwise be wasted are thus reclaimed and the pressure of the fluid in the system is maintained so near atmospheric that the leakage loss otherwise inevitably occurring is materially reduced. Also vapor temperatures which must be very accurately maintained and which are greatly affected by pressure are under much better control and subject to much less variation on account of the substantially constant, substantially atmospheric pressure maintained.

As illustrative of a process and an apparatus to which the subject matter of this invention is applicable, this invention will be more particularly described in connection with the recovery of acetic acid from a liquor, such as pyroligneous acid liquor, containing it, by the use of a solvent such as ether, the dissolved acid being recovered from the solvent which is then used to treat more acid liquor.

An apparatus for carrying out this process is shown somewhat diagrammatically in the accompanying drawing.

Referring to this drawing, 1 indicates a receptacle in which the pyroligneous acid liquor is stored and which serves as a source of the acid liquor to be treated. Acid from this tank is passed through a valved pipe line 2 to the upper portion of an extractor column 3, the pipe as shown having a downwardly looped portion 4 therein to serve as a trap. At 5 is shown an ether storage tank from which the ether passes through the pipe line 6 to the pump 7 from which it is pumped into the lower portion of the extractor column 3 through the pipe 8. The ether passes upwardly through the extractor column 3, coming in intimate contact with the acid liquor passing downwardly through this column and extracting acid therefrom. The acid laden ether passes out from the upper portion of the extractor through the pipe 9 above the entrance of the acid liquor and is trapped through this pipe 9 to the ether fractionating column 10 having a steam heated still 11. The ether vapors in this column freed from acid pass out into the ether condenser 12 and are returned through the trapped line 13 to the storage or supply tank 5. The acid accumulates in the lower portion of the still 11 at the bottom of the fractionating column.

The waste liquor passes from the fractionating column 3 through the pipe 14 and contains some ether and this is conducted to a column 15 into the lower portion of which steam is introduced as through the pipe 16 by which the ether is driven off through the pipe 17 and passes into the vapor line from the fractionating column 10 and from thence to the ether condenser 12. The waste liquor free from ether passes out through the pipe 18 from the lower end of the column 15.

As ether is quite volatile, and as some non-condensable gases are inevitably continually introduced into the system with the liquor and ether, should no vent to the atmosphere be provided, the pressure in the cyclic system in which the ether is used would rise considerably above atmospheric, whereupon the ether vapors would quickly find any leaks in the system and escape to the atmosphere, and traps ordinarily provided on the ether system would be blown to atmosphere. In order to avoid the raising of such pressure materially above atmospheric the pipe 13 is shown as connected to a pipe 20 and the ether supply or storage tank 5 is connected to the pipe 21 and the extractor to a pipe 19, all of these pipes 19, 20 and 21 communicating with a pipe 22 which leads to the lower portion of a scrubber 23, the upper portion of the scrubber being open to the atmosphere through the vent pipe 24. Should pressure occur in the ether system above atmospheric this would immediately be relieved by flow of ether or vapors toward the vent, but it is desirable that only the inert gases such as air and the like which have passed into the system incidentally, as with the acid liquor from the source of supply 1, be permitted to escape. The scrubber 23, therefore, provides means by which any ether or vapors passing toward the vent may be intercepted and absorbed, and for this purpose acid liquor is supplied to the upper portion of the scrubber through the pipe 25. This acid liquor passes down through the scrubber and any vapors or fluids from the ether system as they pass toward the vent 24 are brought into intimate contact with this liquor. This scrubber may be packed with any suitable surface providing material so that intimate contact between the downwardly trickling acid liquor and the upwardly flowing vapors entering from the pipe 22 is effected. The acid liquor in the scrubber absorbs any ether passing into the scrubber and the acid liquor containing such absorbed ether is passed out of the scrubber through the pipe 26 into the pipe 4 and is thus conducted to the extractor column 3 with the acid liquor flowing direct from the source 1 thereto. By this means the pressure in the ether system is reduced to substantially atmospheric, the scrubber itself interposing only a small resistance to free flow of vapors from the ether system, and at the same time any ether which would otherwise escape therefrom is caught and returned to the system for later recovery and reuse as solvent for the acid.

While this invention has been described with particular relation to the recovery of acetic acid, it should be evident that it might be applied in many other industrial processes, and that many changes and modifications may be made therein without departing from its spirit or scope as defined by the appended claims.

I claim:

1. The method of preventing leakage of a treating fluid from a cyclic treating system which comprises venting said system to the atmosphere and absorbing treating fluid tending to escape through said vent in material to be treated by said fluid.

2. The method of preventing leakage from the system in which a solvent is employed to dissolve substances from material treated, which substances are recovered therefrom and the solvent returned to treat more material, which comprises venting such system to the atmosphere, absorbing solvent tending to escape through the vent by fresh material, and then subjecting said fresh material with absorbed solvent to the action of the main body of solvent.

3. The process which comprises passing acetic acid in continuous countercurrent flow contact whereby the ether dissolves and carries acid away with it, subjecting the acid laden ether to continuous distillation to remove the ether from the acid, condensing the ether and returning it to the countercurrent flow, and maintaining the pressure of the ether at substantially atmospheric.

4. The process which comprises passing acetic acid and ether in continuous countercurrent flow contact whereby the ether dissolves and carries acid away with it, subjecting the acid laden ether to continuous distillation to remove the ether from the acid, condensing the ether and returning it to the countercurrent flow, recovering from the treated acid liquor ether contained therein and returning it to the system and maintaining the pressure of the ether at substantially atmospheric.

5. The process which comprises passing acetic acid and ether in continuous countercurrent flow contact whereby the ether dissolves and carries acid away with it, subjecting the acid laden ether to continuous distillation to remove the ether from the acid, condensing the ether and returning it to the countercurrent flow, and absorbing ether tending to escape to atmosphere in fresh acid containing liquor.

6. The process which comprises passing acetic acid and ether in continuous countercurrent flow contact whereby the ether dissolves and carries acid away with it, subjecting the acid laden ether to continuous distillation to remove the ether from the acid, condensing the ether and returning it to the countercurrent flow, absorbing ether tending to escape to atmosphere in fresh acid containing liquor, and passing such liquor and ether to such countercurrent flow.

7. An apparatus comprising a source of material to be treated, a fluid supply, means for subjecting material from said source to the action of fluid from said supply, means for drawing off said fluid together with substances dissolved thereby from said subjecting means, means for drawing off spent material from said subjecting means, means for recovering the dissolved substances and returning the fluid from which such substances are recovered to said supply, means for venting said supply to the atmosphere, means interposed between said venting means and supply for treating fluid passing toward said venting means with material from said source to absorb such fluid, and means for passing such material and absorbed fluid to said subjecting means.

8. An apparatus comprising an extractor, means for delivering material having substances to be extracted to said extractor, means for delivering a solvent for such substances to said extractor, means for removing spent material from said extractor, means for removing substance containing solvent from said extractor, means for separating the substance from the solvent, means for returning the solvent to said extractor, a vent for maintaining said solvent at substantially atmospheric pressure, means to absorb with untreated material solvent tending to escape through said vent, and means for conducting said untreated material and absorbed solvent to said extractor.

9. An apparatus comprising an extractor, means for delivering material having substances to be extracted to said extractor, means for delivering a solvent for such substances to said extractor, means for removing spent material from said extractor, means for recovering solvent from said spent material and returning to said extractor, means for removing substance containing solvent from said extractor, means for separating the substance from the solvent, means for returning the solvent to said extractor, a vent for maintaining said solvent at substantially atmospheric pressure, means to absorb with untreated material solvent tending to escape through said vent, and means for conducting said untreated material and absorbed solvent to said extractor.

10. An apparatus comprising an extractor, means for delivering acid laden liquor to said extractor, means for delivering a volatile solvent for such acid to said extractor, means for removing the acid laden solvent from said extractor, a still for driving off solvent from said acid, a condenser for receiving and condensing the solvent from said still, means for returning such condensed solvent to said extractor, a scrubber through which acid laden liquor passes on its way to said extractor, said scrubber having a vent to atmosphere, and a connection for said solvent to said scrubber from between said condenser and extractor and from said extractor, such that solvent tending to escape through said vent is absorbed by liquor passing through said scrubber.

In testimony whereof I have affixed my signature.

JESSE M. COAHRAN.